Feb. 28, 1967 E. M. GRIEST 3,307,134

ENCAPSULATED IMPEDANCE ELEMENT

Original Filed Dec. 14, 1959

INVENTOR.
EDWARD M. GRIEST
BY Walter S. Zebrowski
ATTORNEY

United States Patent Office 3,307,134

Patented Feb. 28, 1967

3,307,134

ENCAPSULATED IMPEDANCE ELEMENT

Edward M. Griest, Painted Post, N.Y., assignor to Corning Glass Works, Corning, N.Y., a corporation of New York Original application Dec. 14, 1959, Ser. No. 859,342. Divided and this application Apr. 2, 1963, Ser. No. 270,507

2 Claims. (Cl. 338—237)

Figure 1:
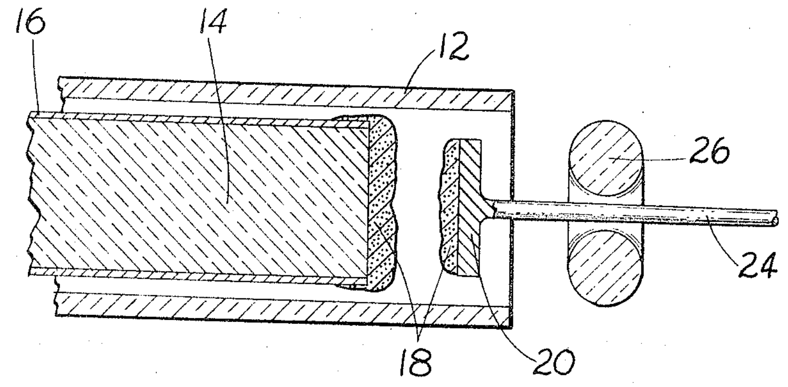

This invention relates to impedance devices and more particularly to a method of encapsulating or hermetically sealing impedance elements and the resulting structure.

This application is a division of application Serial No. 859,342, filed December 14, 1959, now abandoned.

Impedance devices, such as resistors, capacitors, or inductors are usually encapsulated to provide the element with a thermal barrier, or to protect the element from attack by excessive moisture, excessive heat or damage by corrosion or to perform the function of electrically insulating the element from adjacent elements or, in certain applications, all functions may be served.

While I shall describe my novel process and the product resulting therefrom in terms of forming an encapsulated resistor, the preferred embodiment, it is to be understood that I do not wish to be so limited since the invention is not restricted solely to resistors.

The prior art methods of resistor encapsulation, fall into two general categories, the first of which is a potting method whereby the resistance element is coated with an appreciably thick layer of potting material. The potting material is usually in a fluid or semi-fluid state when initially applied to the resistance element, and is subsequently allowed to harden about the body of the element to provide the necessary protective coating. The other method is one where the resistance element is hermetically sealed in a container that may be either evacuated or filled with an inert atmosphere.

In either case, all known methods of sealed resistor fabrication call for the prior formation or manufacture of the complete resistor and then the subsequent step of either potting or sealing. Both methods have serious drawbacks particularly where small, precision, close tolerance, low ohmic resistance elements are required, in that the resistance element is subjected to the relatively high temperature of either the potting compound or the encapsulating sealing flame. It is this exposure to relatively high temperature that causes a radical change in resistance. In many instances, this variation may be great enough to cause the resulting resistance to exceed the allowable tolerance and hence be rejected. A high order of rejection brings about a relatively low selection rate thereby raising the unit cost of the acceptable items.

I have found that by combining the resistor fabricating steps with the sealing step, I am able to appreciably increase the selection rate and produce a resistor noted by its high order of accuracy and its relatively low manufacturing cost.

It is therefore an important object of my invention to provide a hermetically sealed resistor.

Another object of the present invention is to provide a hermetically sealed resistor noted by its high order of accuracy.

Still another object of the present invention is to provide a hermetically sealed resistor noted by its reproducibility and relatively high selection rate.

A further object of the present invention is to provide a hermetically sealed resistor that is noted by its ease of manufacture.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawings in which, FIG. 1 represents an exploded cross-sectional representation of one end of a resistance element indicating the components necessary to form an encapsulated resistor; and FIG. 2 represents a cross sectional representation of one end of my completed resistor in accordance with my invention.

Figure 2:
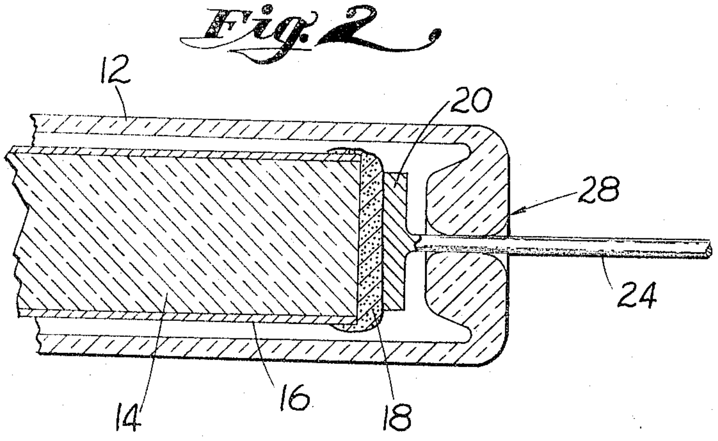

Referring now to FIGS. 1 and 2 there is shown resistor body 14 having for example, an electroconductive film 16 deposited on the surface thereof. For a clear understanding of film 16, its characteristics and one example of its method of application, reference is made to U.S. Patents Nos. 2,564,706 and 2,564,707 issued in the name of John M. Mochel and assigned to the same assignee as the subject application.

Adjacent the end of resistor body 14 is disc 20 to which lead 24 has been welded or affixed in any of many well-known manners. Affixed to the end of disc 20 facing the adjacent end of resistor body 14 is a ceramic frit 18 having conductive particles of silver, for example, embedded therein. This silver-bearing frit has preferably been affixed to the end of resistor body 14 after film 16 has been placed thereon and it should be noted that a portion of frit 18 covers film 16. In both instances, the silver-bearing frits 18 have been baked on to improve the adhering qualities and in preparation for the subsequent operations.

Spaced about lead 24 is a toroidally shaped fusable end portion or bead 26, of glass or the like material, having a coefficient of thermal expansion compatible with that of lead 24. While bead 26 is herein depicted as toroidally shaped, it will be obvious to those skilled in the art that this bead may be either spherical or shaped like a washer, that is it may be flat. In any event, the outside diameter of bead 26 should be only slightly smaller than the inside diameter of the encapsulating sleeve 12 and should also have a coefficient of thermal expansion compatible with the material used for sleeve 12. Sleeve 12 may be formed of glass or the like material.

In accordance with the teachings of my invention a suitable resistance element (14, 16) is cut to length to provide the required resistance. If necessary, film 16 may be appropriately spiralled to achieve higher resistances. The ends of the resistance blank are then dipped in a silver-bearing ceramic frit 18 which is then baked thereon. Frit 18 is preferably in the form of a slurry and consists of a low melting ceramic binder mixed intimately with silver particles, all of which is in suspension in an organic vehicle such as turpentine. I find that the slurry that has particular utility in this connection, utilizes a ceramic binder having a particle size that will pass through a 100 mesh screen yet will be held on a 200 mesh screen. In a preferred form, the total composition of the slurry is about 68 grams of silver, about 10–20 grams of a fritted glass consisting of about 82% PbO, 8% ZnO, 7% $B_2O_3$ and 2% $SiO_2$ with both the frit and silver suspended in about 34 ml. of an organic vehicle such as turpentine.

The next step consists of placing the fusable end portion or bead 26 about lead 24 and applying sufficient heat to fuse the bead 26 to lead 24. After applying frit 18 to disc 20 and heating to insure that the frit 18 adheres to disc 20, the lead subassembly is ready for use.

The next step consists of placing the surface of frit 18 of the lead subassembly in fusable relationship with the surface of frit 18 of the resistance blank and placing sleeve 12 in a spaced relationship about the resistance element (14, 16) and bead 26. An appropriate sealing flame is then applied to the juncture of sleeve 12 and bead 26 to form the junction seal 28 (FIG. 2).

At this point it should be noted that during the sealing operation the heat generated by the flame is conducted through sleeve 12, bead 26 and lead 24 to disc 20. Disc 20 is thus raised to a temperature which is sufficiently higher than the softening point of frit 18 to cause both surfaces of ceramic frit 18 to become fused. This is a radical departure from what is presently known in the art. The trend in the industry is to conduct heat away from the resistance elements to avoid injury thereto. Conversely, I choose to utilize the heat generated by the encapsulating step to perform the function of fusing disc 20 to the resistance element (14, 16) by the use of the intervening conductive ceramic frit 18.

By performing the fusing and sealing steps at the same time I am thus able to avoid the need to subject the resistance element to excessive temperatures during both the resistor fabricating step and again during the encapsulating step.

While I have shown and described my invention in terms of forming and sealing only one end of the resistor, it will be obvious to those skilled in the art that the same steps may be simultaneously or subsequently applied to the other end to form the completed resistor. Also, while I have described my resistance elements (14, 16) in terms of electroconductively coated resistors, it is obvious that other types of resistors, such as wire wound resistors, may be here employed equally as well.

Other embodiments of my invention that will now become apparent, reside in the substitution of either a capacitive or an inductive impedance element for the previously described resistive impedance element.

In the case of the capacitor, the foil or plate ends as well as one end of both terminal leads are coated with the conductive frit and, as in the case of the resistance blank, the fusion of the foil to the lead takes place during the sealing step.

Similarly, to encapsulate an inductive impedance, wire is wound about a form and the wire ends and the form ends are both coated over with the conductive frit. Thereafter, the fusion of the terminal lead to the inductor is accomplished during the sealing step and the process is identical with the previously disclosed with regard to the resistance element.

While I have described what is presently considered the preferred embodiments of my invention, it will be obvious to those skilled in the art that various other changes and modifications may be made therein without departing from the inventive concept, and it is, therefore, aimed in the appended claims to cover all such changes and modifications as fall within the true spirit and scope of my invention.

What is claimed is:

1. An encapsulated impedance device comprising an impedance element, a pair of terminal leads each having a conductive frit at one end, said conductive frit comprising a mixture of about 68 parts by weight of finely divided silver and from about 10 to about 20 parts by weight of fritted glass, said leads being disposed with the frit coated ends adjacent the ends of said element, a sleeve of encapsulating material disposed about said element and a portion of said leads in a spaced relationship therewith, and a fusible end portion disposed about each said lead intermediate the ends thereof having a coefficient of thermal expansion compatible with that of the encapsulating material, said leads being fused to the ends of said device, said fusible end portions being fused to said leads and said sleeve.

2. An encapsulated impedance device comprising an impedance element, a pair of terminal leads adjacent the ends of said element, a layer of a conductive ceramic frit fused to said terminal leads and the ends of said element comprising a mixture of about 68 parts by weight of finely divided silver and from about 10 to about 20 parts by weight of fritted glass consisting by weight of about 83 percent PbO, 8 percent ZnO, 7 percent $B_2O_3$, and 2 percent $SiO_2$, said finely divided silver and fritted glass having a particle size of up to about 100 mesh, a sleeve of encapsulating material disposed about said element and a portion of said leads in a spaced relationship therewith, and a fusable end portion disposed about each said lead intermediate the ends thereof having a coefficient of thermal expansion similar to that of the encapsulating sleeve material, said fusable end portions being fused to said leads and said sleeve.

References Cited by the Examiner

UNITED STATES PATENTS

| | | | |
|---|---|---|---|
| 2,244,548 | 6/1941 | Benkelman | 29—155.69 |
| 2,347,796 | 5/1944 | Podolsky | 338—237 |
| 2,407,251 | 9/1946 | Christensen | 338—325 |
| 2,489,409 | 11/1949 | Green et al. | 338—322 X |
| 2,609,470 | 9/1952 | Quinn | 338—332 X |
| 2,638,523 | 5/1953 | Rubin | 338—332 X |
| 2,864,926 | 12/1958 | Pritikin | 338—322 X |
| 2,882,504 | 4/1959 | Hultgren | 174—52 X |
| 2,883,502 | 4/1959 | Rudner | 338—330 |
| 2,893,182 | 7/1959 | Pies | 29—155.63 |
| 2,942,302 | 6/1960 | Beyer | 29—155.63 X |
| 3,012,214 | 12/1961 | Bronson et al. | 338—237 |
| 3,012,924 | 12/1961 | Browne | 117—227 X |
| 3,023,389 | 2/1962 | Hughes | 338—322 X |
| 3,048,914 | 8/1962 | Kohring | 338—273 X |
| 3,075,860 | 1/1963 | Veres | 117—227 X |

RICHARD M. WOOD, *Primary Examiner.*

V. Y. MAYEWSKY, *Assistant Examiner.*